(12) United States Patent
Kochi et al.

(10) Patent No.: US 7,767,107 B2
(45) Date of Patent: Aug. 3, 2010

(54) PROCESS FOR PRODUCING ALUMINUM ELECTRODE FOIL FOR CAPACITOR AND ALUMINUM FOIL FOR ETCHING

(75) Inventors: Ayumi Kochi, Osaka (JP); Yuji Midou, Osaka (JP); Yukihiro Shimasaki, Hyogo (JP); Hiroshi Fujii, Osaka (JP); Tatsuji Aoyama, Kyoto (JP)

(73) Assignee: Panasonic Corporation, Osaka (JP)

( * ) Notice: Subject to any disclaimer, the term of this patent is extended or adjusted under 35 U.S.C. 154(b) by 762 days.

(21) Appl. No.: 11/631,869

(22) PCT Filed: Aug. 1, 2005

(86) PCT No.: PCT/JP2005/014021
§ 371 (c)(1),
(2), (4) Date: Jan. 8, 2007

(87) PCT Pub. No.: WO2006/013812
PCT Pub. Date: Feb. 9, 2006

(65) Prior Publication Data
US 2007/0241077 A1  Oct. 18, 2007

(30) Foreign Application Priority Data
Aug. 5, 2004  (JP) .............................. 2004-229218

(51) Int. Cl.
*C03C 15/00* (2006.01)
*H01G 9/00* (2006.01)

(52) U.S. Cl. .......................................... 216/102; 216/6

(58) Field of Classification Search ................. 216/100, 216/6, 96, 41, 83, 86; 438/687, 688, 381, 438/FOR. 430; 428/687; 257/E21.012; 205/640
See application file for complete search history.

(56) References Cited

U.S. PATENT DOCUMENTS 4,262,067 A * 4/1981 Philipp et al. ............... 429/139

(Continued)

FOREIGN PATENT DOCUMENTS

JP  59-161808  9/1984

(Continued)

OTHER PUBLICATIONS

Odian, George. Principles of Polymerization, 2004, John Wiley & Sons, fourth edition, p. 351.*

(Continued)

*Primary Examiner*—Binh X Tran
*Assistant Examiner*—Patti Lin
(74) *Attorney, Agent, or Firm*—Wenderoth, Lind & Ponack, L.L.P.

(57) ABSTRACT

A process for producing an aluminum electrode foil for a capacitor, which includes a first step of preparing an emulsion from a mixture including a first phase of a liquid resin or a resin solution obtained by dissolving a resin in a solvent, a second phase of a liquid that is incompatible with the first phase, and an emulsifier; a second step of coating the emulsion on a surface of an aluminum foil; a third step of removing the second phase to form a resin film having a plurality of pores on its surface; a fourth step of etching the aluminum foil having the resin film formed thereon; and a fifth step of removing the resin film after etching. The production process can form high-density etching pits with high accuracy.

18 Claims, 4 Drawing Sheets

U.S. PATENT DOCUMENTS

| | | | |
|---|---|---|---|
| 5,503,664 A * | 4/1996 | Sano et al. | 524/27 |
| 6,106,984 A * | 8/2000 | Kato et al. | 430/49.3 |
| 6,350,871 B1 * | 2/2002 | Sanderson et al. | 540/554 |
| 7,531,078 B1 * | 5/2009 | Strange et al. | 205/661 |
| 2005/0208383 A1 * | 9/2005 | Totsuka et al. | 429/247 |

FOREIGN PATENT DOCUMENTS

JP    8-138977    5/1996

OTHER PUBLICATIONS

Hee, Shane Que. Biological Monitoring: An Introduction, 1993, Wiley, p. 464.*
Chronic Toxicity Summary, Dec. 2000, Glutaraldehyde, p. 1.*
Polyvinyl Alcohol (PVA), Chemical and Technical Assessment (CTA), 2004, prepared by S.K. Saxena.*
JP 8-138977 machine translation (attached as PDF).*

* cited by examiner

First step:
Prepare emulsion

Second step:
Coat emulsion

Third step:
Remove second phase

Fourth step:
Etching

PROCESS FOR PRODUCING ALUMINUM ELECTRODE FOIL FOR CAPACITOR AND ALUMINUM FOIL FOR ETCHING

TECHNICAL FIELD

The present invention relates to a process for producing an aluminum electrode foil for a capacitor used in various aluminum electrolytic capacitors, solid electrolytic capacitors using a conductive polymer as a solid electrolyte, and the like.

BACKGROUND ART

An aluminum electrolytic capacitor is used in various electronic devices. The biggest characteristic of the aluminum electrolytic capacitor is in the capacitance per unit volume larger than that of other capacitors such as a ceramic capacitor. Achieving a large capacitance of the aluminum electrolytic capacitor is largely dependent upon the specific surface area of an aluminum electrode foil. Therefore, in general, an aluminum electrode foil is subjected to an electrochemical or chemical etching process so as to increase an effective specific surface area. Furthermore, in order to increase the surface area expansion rate, which represents an amount of the surface area per unit volume, an etching method has been improved for increasing the density of the number of etching pits and increasing the depth and thickness of the etching pit.

For example, Japanese Patent Unexamined Publication No. S62-62890 discloses an improvement in an etching method. According to the disclosure, etching is carried out after ink including a metal nobler than aluminum, which becomes an etching core, is printed in dots on the surface of an aluminum electrode foil, and thus etching starting points are controlled.

However, in the above-mentioned conventional technology, since aggregation or segregation of the metal nobler than aluminum occurs, it has been difficult to obtain uniformly and finely controlled etching starting points.

SUMMARY OF THE INVENTION

An object of the present invention is to provide a process for producing an aluminum electrode foil for a capacitor, which is capable of resolving a conventional problem.

A process for producing an aluminum electrode foil for a capacitor in accordance with the present invention includes a first step of preparing an emulsion from a mixture including a first phase of a liquid resin or a resin solution obtained by dissolving a resin in a solvent, a second phase of a liquid that is incompatible with the first phase, and an emulsifier; a second step of coating the emulsion on a surface of an aluminum foil; a third step of removing the second phase to form a resin film having a plurality of pores on its surface; a fourth step of etching the aluminum foil having the resin film formed thereon; and a fifth step of removing the resin film after etching.

The process for producing an aluminum electrode foil for a capacitor of the present invention can expand the surface area of the aluminum foil by carrying out etching after etching starting points are formed uniformly and with a high density on the aluminum foil. Therefore, it is possible to achieve a capacitor having a high capacitance density by using this aluminum electrode foil for a capacitor.

Figure 1:
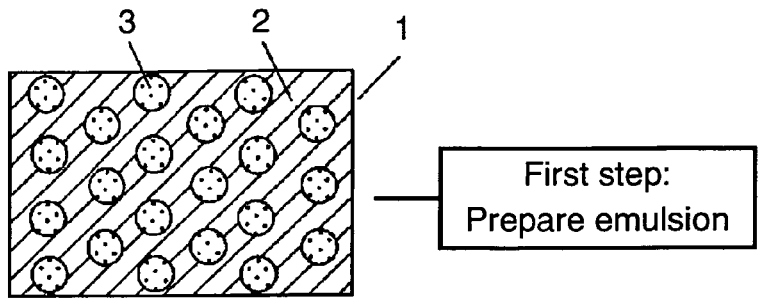
FIG. 1 is a sectional view to illustrate a process for producing an aluminum electrode foil for a capacitor in accordance with one exemplary embodiment of the present invention.

REFERENCE MARKS IN THE DRAWINGS 1 emulsion
2 first phase
2a resin film
3 second phase
4 aluminum foil
40 pores of resin film 2a
41 etching starting point
5 etching pit

DETAILED DESCRIPTION OF THE PREFERRED EMBODIMENTS

First Exemplary Embodiment

Hereinafter, a process for producing an aluminum electrode foil for a capacitor in accordance with one embodiment of the present invention is described with reference to drawings.

Figure 6:
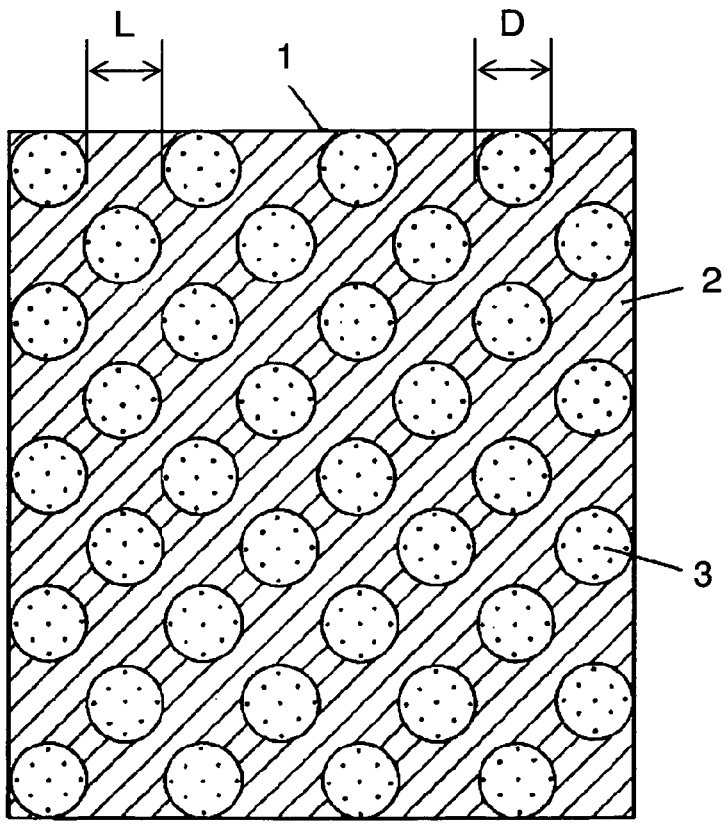
FIG. 6 is a plan view showing an emulsion coated on an aluminum foil.

FIGS. 1 to 5 are sectional views to illustrate a process for producing an aluminum electrode foil for a capacitor in accordance with one embodiment of the present invention. FIG. 6 is a plan view showing an aluminum electrode foil viewed from upside.

Firstly, a first step for preparing an emulsion is described.

A compound containing 200 g of 10% aqueous solution of an isobutylene-maleic anhydride copolymer that is a water soluble resin, 100 g of n-dodecane that is aliphatic hydrocarbon as a solvent, 8 g of polyoxyethylene-polyoxypropylene glycol that is a surfactant as an emulsifier, and 0.5 g of glycerin as a cross-linking agent of the isobutylene-maleic anhydride copolymer is stirred and dispersed for 15 minutes by using a stirrer and disperser such as a homogenizer. In the prepared emulsion, a diameter of n-dodecane is about 5 μm and the interval between particles of n-dodecane is about 5 μm.

Herein, a homogenizer carries out dispersion and emulsification by pressurizing raw materials at high pressure or ultra-high pressure and using a shearing force at the time of passing through a slit (gap). A homogenizer is a system for carrying out a series of homogenation from stirring to dispersion. Furthermore, for example, an ultra high-speed homogenizer has a generator. When an inner blade is rotated at a high speed in a liquid, the liquid in the generator is vigorously injected by centrifugation in the radial direction from the window opened in an outer blade. At the same time, a liquid enters the inside of the generator, and thus strong convection occurs in a whole container. A liquid sample enters the convection and at the tip of the inner blade, rough crushing is carried out. Immediately before the liquid sample is released from the inner blade through the window of the outer blade, fine crushing is carried out between the inner blade and the outer blade. Furthermore, when high-speed rotation is carried out, stirring and dispersion are carried out by the effect of ultrasonic wave, high frequency wave, and the like, generated between the inner blade and the window of outer blade.

A state of emulsion 1 obtained by such a method is shown in FIG. 1. Emulsion 1 is also referred to as a liquid emulsion. A liquid emulsion refers to a mixture of two or more liquids that do not mix together in which one liquid is dispersing and floating as fine particles in the other liquid.

Therefore, in order to obtain emulsion 1, at least both first phase 2 including resin and second phase 3 without including resin must be a liquid. First phase 2 and second phase 3 must be incompatible with each other. As a result of the investigation on combinations of first phase 2 and second phase 3, in the case where the first phase was an aqueous solution of a water soluble resin, a good result was obtained when the second phase was aliphatic hydrocarbon. Furthermore, as the emulsifier (not shown) to be used herein, a surfactant can be used. However, the emulsifier is not necessarily limited to a surfactant as long as it works as an emulsifier.

Figure 10:
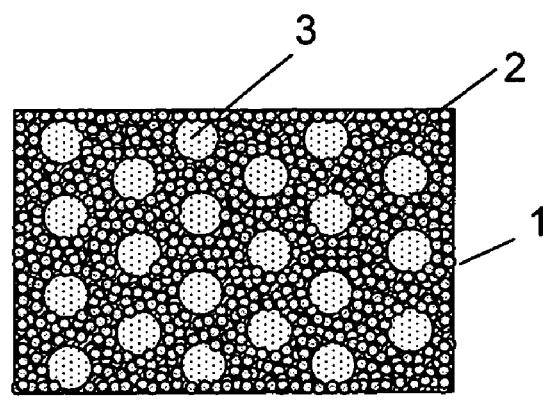
FIG. 10 is a plan view to illustrate a form of another emulsion in accordance with one embodiment of the present invention.

Note here that when first phase 2 is an emulsion liquid of a water insoluble resin, which can be formed into a film after being coated and dried, the same results can be also obtained. The state of the liquid emulsion in this case is shown in FIG. 10.

As shown in FIG. 1, emulsion 1 in this exemplary embodiment has a form in which the surface of n-dodecane that is aliphatic hydrocarbon constituting second phase 3 is extremely thinly covered with polyoxyethylene-polyoxypropyleneglycol that is an emulsifier (not shown). Second phases 3 are uniformly dispersed in first phase 2 that is an aqueous solution of an isobutylene-maleic anhydride copolymer. In other words, in first phase 2 that is a sea-like continuous phase, second phases 3 are dispersed in independent an island shape in the island-sea structure (hereinafter, an island form). Note here that the island form includes a spherical shape.

The particle shape, generation density and particle interval of second phase 3 in emulsion 1 can be controlled by the kind and addition amount of the emulsifier and the stirring and dispersing conditions. For example, in order to realize emulsion 1 having second phases 3 with a small particle shape, the addition amount of emulsifier is increased so as to increase the surface area, and large mechanical stress is applied at the stirring and dispersing time.

Furthermore, when any one of cellulose, polyvinyl alcohol, polyethylene oxide, polyacrylamide and polyvinylpyrrolidone or a mixture thereof is used as the water soluble resin, the intended emulsion 1 can be prepared.

Furthermore, as a solvent suitable for second phase 3, aliphatic hydrocarbon can be used. Among aliphatic hydrocarbons, any one of octane, nonane, decane, dodecane and trimethylhexane or a mixture thereof can be used. Thereby, a necessary role as second phase 3 can be exhibited and emulsion 1 can be prepared.

In the above description, the case of the combination of first phase 2 that was a water soluble resin and second phase 3 that was aliphatic hydrocarbon was described. As another example, a solution obtained by dissolving water-insoluble resin in a nonaqueous solvent was used as first phase 2 and water was used as second phase 3. Also with this combination, the advantage of the exemplary embodiment of the present invention was obtained. In this case, since the water-insoluble resin contained in first phase 2 is not generally dissolved in an etchant, cross-linking may not be carried out. However, when the water-insoluble resin contained in first phase 2 is dissolved, the resin may be cross-linked by, for example, using a cross-linking agent.

An example of the water-insoluble resin used in the other example mentioned above can include any one of a polyester resin, phenol resin, silicone resin, acrylic resin, polyimide resin, butyral resin, or a mixture thereof. By dissolving such water-insoluble resins in organic solvent like ketone, ester or aromatic hydrocarbon, liquid-state first phase 2 can be obtained.

In the combination of the other example mentioned above, by using an organic solvent whose boiling point is lower than that of water, the organic solvent in the water-insoluble resin can be volatilized in a state in which water that is second phase 3 is remained.

Furthermore, in the first step, as a stirrer and disperser, a homogenizer was used. It is confirmed that uniform emulsion 1 can be similarly prepared when a jet mill is used. The jet mill is a machine capable of generating a vortex like a tornado inside a crushing chamber and allowing particles or liquids to clash into each other in the vortex so as to be pulverized or stirred and dispersed. The similar advantage can be obtained with other machine as long as the machine has such a function.

Next, as a second step, a step for coating emulsion 1 prepared in the above-mentioned method on the surface of aluminum foil 4 is described.

Figure 2:
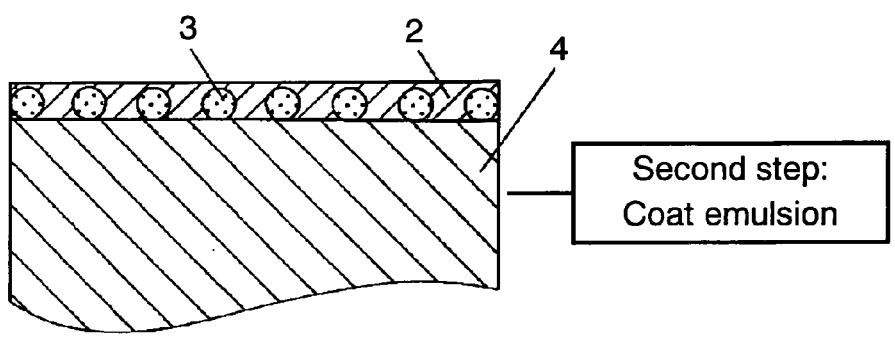
FIG. 2 is a sectional view to illustrate a process for producing an aluminum electrode foil for a capacitor in accordance with one exemplary embodiment of the present invention.

Aluminum foil 4 having a purity of 99.99%, (100) orientation occupancy rate of 90% and thickness of 104 μm was used. Emulsion 1 was uniformly coated on aluminum foil 4 by using a die coater to the thickness of 6 to 7 μm. The sectional view at this time is shown in FIG. 2 and a plan view viewed from upside is shown in FIG. 6. In this exemplary embodiment, n-dodecane as second phase 3 is adjusted to have the particle diameter of 5 μm and particle interval of 5 μm.

At this time, in the case where 100% of liquid-state first phase 2 is formed of a resin component, it is preferable that the thickness of coating is the same as the thickness of second phase 3. The case where 100% of first phase 2 is formed of a resin component means the case where a resin forming first phase 2 is a liquid resin. When a liquid resin is used, the third step includes a step for cross-linking the liquid resin. As a method for cross-linking the liquid resin, when the liquid resin has an unsaturated bond, after mixing a cross-linking agent, cross-linking is carried out by heating or by photo irradiation. Furthermore, when the liquid resin includes a carboxyl group, and the like, a condensation reaction can be used. Furthermore, when the liquid resin includes an isocyanate group, and the like, an addition reaction can be also used.

Furthermore, as the method of coating emulsion 1 in the second step, in addition to the above-mentioned die coater, any of gravure printing, a reverse roll, and a bar coater can be used. In this case, similar precision can be achieved and coating can be carried out uniformly and efficiently.

Furthermore, when first phase 2 includes water or an organic solvent used as a solvent in order to make first phase 2 be in a liquid state, it is preferable that first phase 2, after water, an organic solvent, or the like, has been volatilized, has the thickness similar to the diameter of second phase 3.

Next, a third step for removing a solvent is described.

Water contained in first phase 2 (an aqueous solution of isobutylene-maleic anhydride copolymer) is evaporated by, for example, a drier, at temperature conditions of 105° C. for 10 minutes, followed by subjecting the isobutylene-maleic anhydride copolymer to a cross-linking reaction at temperature conditions of 150° C. for 30 minutes, so that a film of the water-insoluble resin is coated to the thickness of 2 to 5 μm.

Because such treatment is needed, a solvent whose boiling point is higher than that of water is used for second phase 3. Thus, only water contained in liquid-state first phase 2 can be volatilized.

Figure 3:
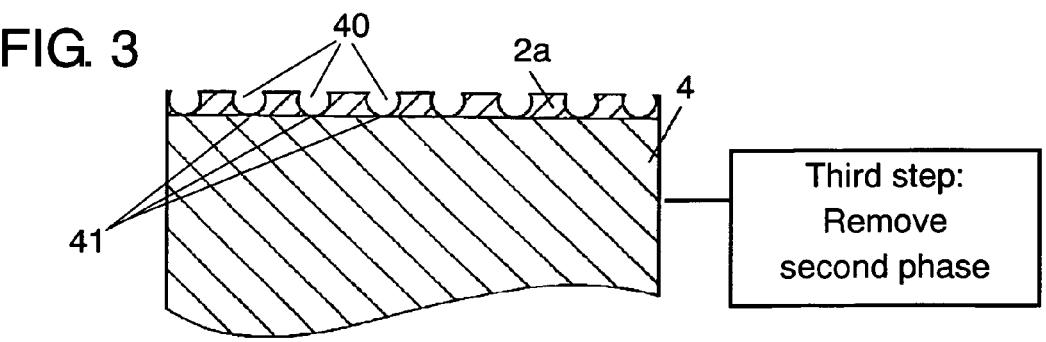
FIG. 3 is a sectional view to illustrate a process for producing an aluminum electrode foil for a capacitor in accordance with one exemplary embodiment of the present invention.

Next, in order to remove the solvent of second phase 3, the coated film is heated at the temperature conditions of 220° C. for 10 minutes. By volatilizing n-dodecane as second phase 3 dispersed in the coated film by heating, resin film 2a of isobutylene-maleic anhydride copolymer having pores 40 formed in, for example, dots is provided. Because second phases 3 dispersed in the coated film are volatilized to be removed by heating at 220° C. for 10 minutes, on the surface of aluminum foil 4, resin film 2a (isobutylene-maleic anhydride copolymer) having pores 40 is provided. Pores 40 have a diameter of about 5 μm and regularly open at intervals of about 5 μm. This state is shown in FIG. 3.

In the third step, second phase 3 was removed by drying. However, when the solvent of second phase 3 is aliphatic hydrocarbon, second phase 3 may be removed by washing with a diluent solvent capable of dissolving this aliphatic hydrocarbon. Also in this case, the similar coated film can be obtained. When the solvent of second phase 3 is, for example, n-dodecane used in this exemplary embodiment, second phase 3 was able to be removed by washing with methylethylketone or ethanol.

When the opening portion of pore 40 of resin film 2a is somewhat small, by polishing the surface of resin film 2a to make opening larger, penetration or circulation of etchant, which are the following steps, can be improved. Thus, more uniform etching can be carried out.

Next, a fourth step including etching carried out for enhancing the surface area expansion rate of aluminum foil 4 is described.

As the etchant, NaCl water with a concentration of 20% is used. This etchant is maintained at 70° C. and aluminum foil 4 is input into the etchant. Electrolytic etching is carried out at a direct current density of 15 A/dm$^2$ for 4 to 5 minutes with aluminum foil 4 provided at the side of anode and with carbon, titanium foil, or the like, provided at the side of the cathode. After this etching, aluminum foil 4 is washed with pure water, and the like.

Figure 4:
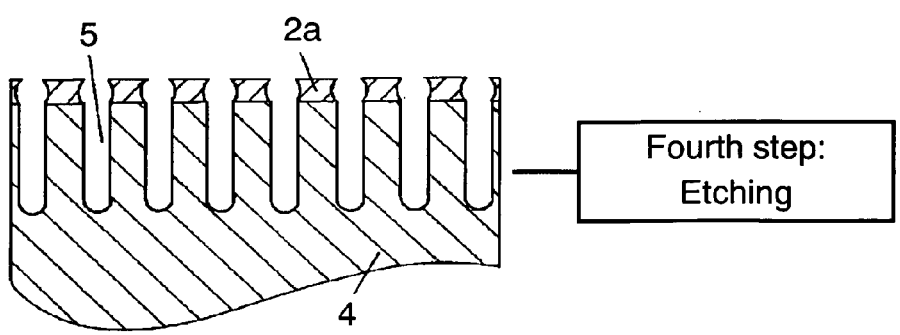
FIG. 4 is a sectional view to illustrate a process for producing an aluminum electrode foil for a capacitor in accordance with one exemplary embodiment of the present invention.
Figure 5:
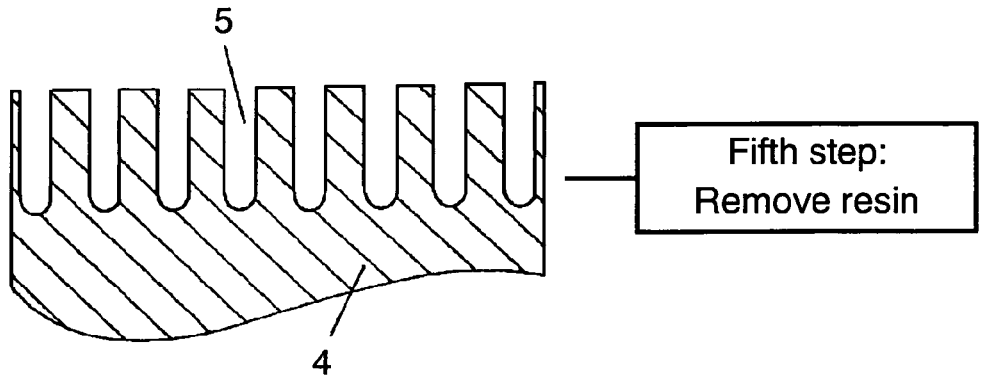
FIG. 5 is a sectional view to illustrate a process for producing an aluminum electrode foil for a capacitor in accordance with one exemplary embodiment of the present invention.

When aluminum foil 4 is etched in this way, etching is carried out only from etching starting point 41 corresponding to the bottom portion of the pores formed after second phase 3 has been removed. Etching proceeds in the depth direction of aluminum foil 4 and etching pits 5 as shown in FIG. 4 can be formed. At this time, to a portion covered with resin film 2a having dots, etching is not generally carried out. Even if resin film 2a is dissolved in an etchant, before resin film 2a is completely dissolved, pores 40, which are formed in the portions from which second phase 3 has been removed, are firstly etched. That is to say, since aluminum foils 4 is exposed or a resin film thinner than resin film 2a is formed on aluminum foil 4 on the bottom surface of pores 40, the bottom surface of pores 40 can work as an etching starting point. Note here that a material of resin film 2a to be used is preferably a material insoluble in an etchant or a material that is poorly dissolved.

Therefore, since etching is started only from pores 40 formed after second phase 3 has been regularly removed, by using the shape and density of pores 40 formed after second phase 3 has been removed, the generation density and shape (thickness) of etching pits 5 can be controlled.

Note here that the method of etching is not limited to the above-mentioned electrolytic etching and other method may be employed. Various etching methods can be carried out.

When aluminum foil 4 is etched by such a method, excellent aluminum electrode foils for an aluminum electrolytic capacitor can be produced.

Furthermore, dot-like resin film 2a formed in the third step is formed to have a fine hole structure in which a large number of fine holes are arranged, an etchant can be maintained in the fine holes at the time of etching, and electric current can be easily concentrated to the fine holes. Thus, etching can be started more selectively.

Furthermore, since high purity aluminum having a purity of 99.99% or higher is used for aluminum foil 4, an aluminum electrode foil for an aluminum electrolytic capacitor does not cause erosion, so that high reliability such as humidity deterioration resistance, durability, and the like, can be achieved.

Furthermore, when high purity aluminum having the (100) orientation of 85% or higher is used for aluminum foil 4, etching can be uniformly proceeded from a large number of etching starting points 41 at the time of etching.

Furthermore, when a thin coated film of isobutylene-maleic anhydride copolymer, which is formed with dots, remains on the surface of aluminum foil 4 from which second phase 3 has been removed, for use as etching starting point 41, the thin film is removed by washing with an alkaline solution or by cleaning the surface by corona treatment or plasma treatment.

Next, a fifth step for removing resin film 2a is described.

Aluminum foil 4 after being etched is dipped in 2% aqueous solution of NaOH so as to remove resin film 2a. Thereby, aluminum foil 4 shown in FIG. 5 can be produced. By the above-mentioned step, an aluminum electrode foil for an aluminum electrolytic capacitor of the present invention can be produced.

A step for producing aluminum electrode foil for an aluminum electrolytic capacitor of the present invention by using aluminum foil 4 produced by the above-mentioned steps is described hereinafter.

Aluminum foil 4 produced by the fifth step was dipped in 8% aqueous solution of boric acid and anodization was carried out at 85° C. with 380 V of voltage applied. With anodization, on the surface of aluminum foil 4 including the surface of etching pits 5, a thin film of aluminum oxide was formed (not shown). Since the thin film of aluminum oxide is an excellent dielectric film, it can be used for an aluminum electrode foil for various capacitors.

Next, the electric properties of the aluminum electrolytic capacitors using the aluminum electrode foil for a capacitor of this exemplary embodiment were evaluated. For the evaluation, an aluminum electrolytic capacitor was produced in accordance with the standard RC-2364A of Japan Electronics and Information Technology Industries Association (JEITA)

(Example 1). When the capacitance of the aluminum electrolytic capacitor was measured, it was 0.80 µF/cm$^2$.

A comparative example is described. In the comparative example, aluminum foil 4 used in this exemplary embodiment was used. An aluminum electrode foil for an aluminum electrolytic capacitor to be used in a comparative example was produced by etching aluminum foil 4 under the same conditions as those of the fourth step without carrying out the first to third steps of this exemplary embodiment. An aluminum electrolytic capacitor was produced in accordance with the standard RC-2364A of Japan Electronics and Information Technology Industries Association (JEITA) by using an etched aluminum electrode foil (comparative example). The capacitance of the aluminum electrolytic capacitor in accordance with the comparative example was 0.70 µF/cm$^2$.

Thus, the aluminum electrolytic capacitor produced by this exemplary embodiment showed a capacitance value that was 10% or larger than that of the aluminum electrolytic capacitor produced by a conventional method in accordance with the comparative example. This is because, although the same aluminum foil 4 is used, by carrying out the first to third steps of this exemplary embodiment, etching pits 5 can be formed uniformly and with a high density, and an aluminum electrode foil for an aluminum electrolytic capacitor having a high surface area expansion rate can be obtained.

Note here that Example in which etching pits 5 are formed on one side of aluminum foil 4 was described. However, in order to obtain higher capacitance, it is effective that etching pits are formed on both surfaces. The method of the present invention is applied to both surfaces of aluminum foil 4, thereby enabling etching pits 5 to be formed with a high density. The configuration thereof can be appropriately selected from the viewpoint of the electric properties and dimension and shape of the aluminum electrolytic capacitor.

Furthermore, the present invention is not limited to aluminum electrolytic capacitor having a liquid electrolyte but may be applied to an aluminum electrolytic capacitor using a solid electrolyte. In this case, a capacitor with a high capacitance density can be obtained.

Figure 7:
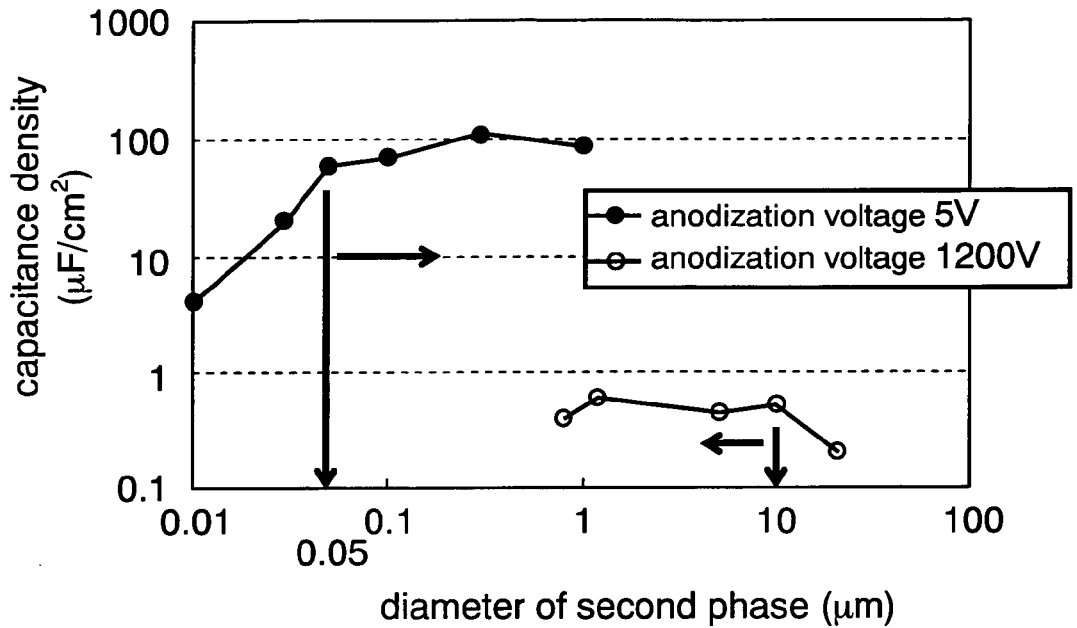
FIG. 7 is a graph showing the relation between a diameter of a solvent of the emulsion and the capacitance density.
Figure 8:
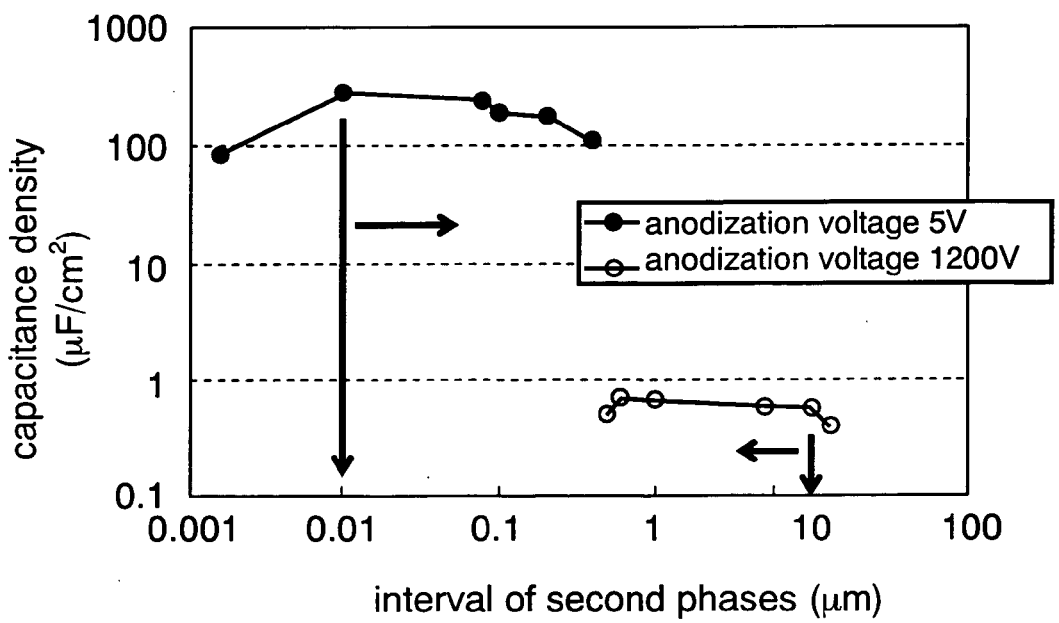
FIG. 8 is a graph showing the relation between an interval of a solvent of the emulsion and the capacitance density.

Next, the results of the investigation on the optimum range of the form of emulsion 1 are described. As shown in FIG. 6, the emulsion was coated on the aluminum foil while changing outer diameter D of second phase 3 and interval L between islands. Furthermore, an aluminum electrode foil for an aluminum electrolytic capacitor was produced in accordance with this exemplary embodiment. Note here that 8% of aqueous solution of boric acid was used as an anodizing solution and anodization was carried out at applied voltages of 5 volt (V) and 1200 V so as to form anodic oxide films. By using an etched aluminum electrode foil, an aluminum electrolytic capacitor was produced and capacitance was measured. Based on the measured capacitance, capacitance per unit area (capacitance density) of the aluminum foil was calculated. FIGS. 7 and 8 show the relation of the size of second phase 3 or the interval between second phase 3 with respect to the capacitance density.

FIG. 7 shows a result of experiment in which interval L between second phases 3 is made constant (0.8 µm) and outer diameter D is changed. In order to expand the surface area of aluminum foil 4, diameters D of second phases 3, each of which is present in an individual form (that is, island form), are preferably in the range from 0.05 to 10 µm. When diameter D is smaller than 0.05 µm, when anodization is carried out at low voltage (5V) in order to obtain capacitors with large capacitance, the capacitance density becomes small. This is because pores 40 are too small, the etchant is difficult to penetrate, so that pore 40 cannot play a role as an etching starting point. On the other hand, in the case where diameter D is larger than 10 µm, when the anodization is carried out with high voltage (1200 V) in order to obtain a capacitor with high withstand voltage, the number of etching starting points per unit area is reduced and the surface area expansion rate by etching is reduced, thus making it difficult to obtain the intended effect.

FIG. 8 shows a result of experiment in which outer diameter D of second phase 3 is made constant (0.8 µm) and interval L between second phases 3 is changed. It is preferable that intervals L in which island second phases 3 are dispersed are made to be at least a range from 0.01 to 10 µm as shown in FIG. 8 for realizing the expansion of the surface area. When interval L is smaller than 0.01 µm, in etching or anodization at applied voltage of 5 V, the aluminum foil is dissolved and the neighboring etching pits superpose, so that etching pits are damaged. On the other hand, when interval L is larger than 10 µm, when applied voltage is 1200 V, the number of etching starting points per unit area is reduced, and the surface area expansion rate by etching is reduced, thus making it difficult to obtain the intended effect.

In general, most of the particle diameters of dispersed particles in an emulsion are in the range from bout 0.01 to about 10 µm. However, in the exemplary embodiment of the present invention, for realizing the expansion of the surface area, it is preferable that diameter D of second phase 3 is made to be in the range from 0.05 to 10 µm and interval L of second phase 3 is made to be in the range from 0.01 to 10 µm.

An example of methods for measuring such particle diameters includes an optical measuring method and a measuring method using particle size distribution measuring instrument using a laser. In this exemplary embodiment, the measurement was carried out by a particle distribution measuring instrument using a laser.

Figure 9:
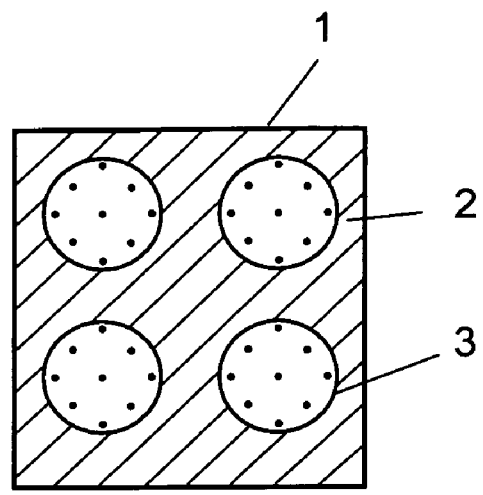
FIG. 9 is a plan view showing a form of an emulsion in accordance with one embodiment of the present invention.

Furthermore, in the description of the present invention, as an example, the case where the solvent in the emulsion has a particle diameter of 5 µm and particle interval of 5 µm was described. The present invention is not limited to this. For example, as shown in FIG. 9, the particle diameter and particle interval of the second phases in the emulsion can be arbitrarily combined. Therefore, as long as the density of the etching starting points per unit area is substantially uniform, the outer shape of pores 40 and interval thereof are not necessary to be substantially uniform or regular.

As mentioned above, in the present invention, emulsion 1 including at least first phase 2, second phase 3 and an emulsifier is coated on the surface of aluminum foil 4. Thereafter, the resin contained in first phase 2 is cured, followed by removing second phase 3 so as to form resin film 2a with dots. Then, etching is carried out by using the portions from which second phases 3 have been removed as etching starting points. After etching, resin film 2a with dots formed on the surface of aluminum foil 4 is removed. With such a production method, etching pits 5 can be formed with high density and high precision. As a result, an aluminum electrolytic capacitor in which the area of aluminum foil 4 is expanded and which has a high capacitance density can be realized.

INDUSTRIAL APPLICABILITY

As mentioned above, a process for producing an aluminum electrode foil for a capacitor of the present invention can realize a capacitor with a high capacitance density by achieving the expansion of the surface area of the aluminum foils by forming high density etching pits with high precision, and therefore it is useful for electric foils for an aluminum electrolytic capacitor used in various electric devices.

The invention claimed is:

1. A process for producing an aluminum electrode foil for a capacitor, the process comprising:
    a first step for preparing an emulsion from a mixture including a first phase of a liquid at least containing a resin, a second phase of a liquid that is incompatible with the first phase, and an emulsifier;
    a second step for coating the emulsion on a surface of an aluminum foil;
    a third step for removing the second phase to form a resin film having a plurality of pores on its surface;
    a fourth step for etching the aluminum foil having the resin film formed thereon; and
    a fifth step for removing the resin film after the etching.

2. The process of claim 1, wherein the first phase includes a liquid resin or a resin solution obtained by dissolving a resin in a solvent, the mixture further includes a cross-linking agent, and the third step includes cross-linking the liquid resin or the dissolved resin.

3. The process of claim 1, wherein the first step includes stirring and dispersing the mixture by using a homogenizer or a jet mill.

4. The process of claim 1, wherein the second step includes coating the emulsion by using any one of a die coater, gravure printing, a reverse roll, and a bar coater.

5. The process of claim 1, wherein the third step includes removing the second phase by using a solvent for dissolving the liquid of the second phase.

6. The process of claim 1, wherein the third step is evaporating the liquid of the second phase by heating.

7. The process of claim 1, wherein the aluminum foil is high purity aluminum with a purity of 99.99% or more.

8. The process of claim 1, wherein the aluminum foil is aluminum with (100) orientation of 85% or more.

9. The process of claim 1, wherein the first step includes preparing an emulsion in a form in which particles of the second phase are individually dispersed in a liquid that is the first phase.

10. The process of claim 9, wherein a diameter of the particles of the second phase is in a range from 0.05 to 10 μm.

11. The process of claim 9, wherein an interval between particles of the second phase is in a range from 0.01 to 10 μm.

12. The process of claim 1, wherein the first phase is a resin solution obtained by dissolving a water-insoluble resin in any one of organic solvent from ketone, ester and hydrocarbon, and the second phase is water.

13. The process of claim 12, wherein a boiling point of the solvent in the first phase is lower than 100° C.

14. The process of claim 12, wherein the water-insoluble resin includes at least one of a polyester resin, a phenol resin, a silicon resin, an acrylic resin, a polyimide resin, and butyral resin.

15. The process of claim 1, wherein the first phase includes a liquid resin or a resin solution obtained by dissolving a resin in a solvent, the resin included in the first phase is a water soluble resin, the second phase is aliphatic hydrocarbon, and the third step includes cross-linking the water soluble resin so as to be insolubilized in water.

16. The process of claim 15, wherein a boiling point of the liquid in the second phase is higher than 100° C.

17. The process of claim 15, wherein the water soluble resin is a resin including at least one of an isobutylene-maleic anhydride copolymer, cellulose, polyvinyl alcohol, polyethylene oxide, polyacrylamide and polyvinylpyrrolidone.

18. The process of claim 15, wherein the second phase includes at least one of octane, nonane, decane, dodecane and trimethylhexane.

* * * * *